United States Patent
Son et al.

(10) Patent No.: US 10,910,660 B2
(45) Date of Patent: Feb. 2, 2021

(54) METHOD OF MANUFACTURING MEMBRANE-ELECTRODE ASSEMBLY FOR FUEL CELLS

(71) Applicants: Hyundai Motor Company, Seoul (KR); Kia Motors Corporation, Seoul (KR)

(72) Inventors: Dae Yong Son, Seoul (KR); Yoon Hwan Cho, Gyeonggi-Do (KR); Jin Seong Choi, Gyeonggi-Do (KR); Yong Min Kim, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 29 days.

(21) Appl. No.: 16/130,364

(22) Filed: Sep. 13, 2018

(65) Prior Publication Data
US 2019/0207238 A1    Jul. 4, 2019

(30) Foreign Application Priority Data
Dec. 29, 2017  (KR) .......................... 10-2017-0183875

(51) Int. Cl.
*H01M 8/1004* (2016.01)
*H01M 4/88* (2006.01)
(Continued)

(52) U.S. Cl.
CPC .......... *H01M 8/1004* (2013.01); *B01J 23/42* (2013.01); *B01J 37/0009* (2013.01);
(Continued)

(58) Field of Classification Search
CPC .... B01J 23/42; B01J 37/0009; H01M 4/8828; H01M 4/8882; H01M 4/9041;
(Continued)

(56) References Cited

U.S. PATENT DOCUMENTS

| 2006/0188775 A1* | 8/2006 | Mance ............... H01M 4/8652 |
| | | 429/482 |
| 2010/0330463 A1* | 12/2010 | Jang .................... H01M 4/8832 |
| | | 429/535 |

(Continued)

FOREIGN PATENT DOCUMENTS

| JP | 5510181 B2 | 6/2014 |
| KR | 100612873 B1 | 8/2006 |

(Continued)

*Primary Examiner* — Jun Li
(74) *Attorney, Agent, or Firm* — Mintz Levin Cohn Ferris Glovsky and Popeo, P.C.; Peter F. Corless

(57) ABSTRACT

Disclosed is a method of manufacturing a membrane-electrode assembly for fuel cells. The method includes (a) admixing a metal catalyst, an ionomer and a first dispersion solvent to prepare a first admixture, (b) heat treating the first admixture prepared in (a) to form an ionomer-fixed metal catalyst, and (c) immersing the ionomer-fixed metal catalyst formed in (b) in a solvent, wherein the solvent in (c) may include one or more selected from the group consisting of ethanol, propanol, and isopropyl alcohol. The membrane-electrode assembly for fuel cells manufactured by the method may have substantially improved durability.

15 Claims, 5 Drawing Sheets

(51) Int. Cl.
  *H01M 4/92* (2006.01)
  *B01J 23/42* (2006.01)
  *B01J 37/00* (2006.01)
  *H01M 4/90* (2006.01)

(52) U.S. Cl.
  CPC ....... *H01M 4/8828* (2013.01); *H01M 4/8882* (2013.01); *H01M 4/9041* (2013.01); *H01M 4/9083* (2013.01); *H01M 4/92* (2013.01); *H01M 4/926* (2013.01); *H01M 2250/20* (2013.01)

(58) Field of Classification Search
  CPC ...... H01M 4/9083; H01M 4/92; H01M 4/926; H01M 8/1004; H01M 8/1069
  See application file for complete search history.

(56) References Cited

U.S. PATENT DOCUMENTS

| | | | | |
|---|---|---|---|---|
| 2012/0058414 | A1* | 3/2012 | Cho | H01M 4/926 429/492 |
| 2013/0157169 | A1* | 6/2013 | Madden | H01M 4/926 429/482 |
| 2014/0287343 | A1* | 9/2014 | Ono | H01M 4/926 429/483 |
| 2015/0236354 | A1* | 8/2015 | Binder | H01M 4/8663 502/1 |

FOREIGN PATENT DOCUMENTS

| | | | |
|---|---|---|---|
| KR | 20100068029 A | * | 6/2010 |
| KR | 20100068029 A | | 6/2010 |
| KR | 101071766 B1 | | 10/2011 |
| KR | 20170004413 A | | 1/2017 |

* cited by examiner

METHOD OF MANUFACTURING MEMBRANE-ELECTRODE ASSEMBLY FOR FUEL CELLS

CROSS-REFERENCE TO RELATED APPLICATION

This application claims, under 35 U.S.C. § 119(a), the benefit of priority to Korean Patent Application No. 10-2017-0183875 filed on Dec. 29, 2017, the entire contents of which are incorporated herein by reference.

TECHNICAL FIELD

The present invention relates to a method of manufacturing a membrane-electrode assembly for fuel cells with improved durability.

BACKGROUND

In a conventional manufacturing process of mixing an ionomer and a catalyst, and drying the mixture during preparation of a slurry for fuel cells, the ionomer may be deposited around the catalyst, which causes a decrease in mass transport resistance and weakens the function of binder between the electrode and the membrane in spite of increased performance. For example, the electrode can be detached from the membrane under freezing and thawing conditions due to weak interfacial adhesion between the electrode and the membrane.

In an attempt to solve this problem, research has been conducted on technologies to improve adhesion between the electrode and the membrane.

For example, in related arts, a polymer electrolyte membrane has been made to include a hydrocarbon-based membrane in which an ionic exchange group is introduced and a fluorine-based ionomer coating layer in which an ionic exchange group is introduced, wherein the fluorine-based ionomer coating layer is provided on two surfaces of the hydrocarbon-based membrane.

However, the above described process of introducing an ion-conducting polymer or a hydrophilic functional group into the electrolyte membrane to improve adhesion between the electrode and the electrolyte membrane includes a complicated manufacturing process.

The above information disclosed in this Background section is provided only for enhancement of understanding of the background of the invention and therefore it may contain information that does not form the prior art that is already known in this country to a person of ordinary skill in the art.

SUMMARY OF THE INVENTION

In preferred aspects, the present invention provides a method of manufacturing a membrane-electrode assembly with improved durability for fuel cells. Preferably, the method may include applying a released ionomer-containing catalyst to the membrane-electrode assembly for fuel cells.

The objects of the present invention are not limited to those described above. The objects of the present invention will be clearly understood from the following description and could be implemented by means defined in the claims and a combination thereof.

In one aspect, the present invention provides a method of manufacturing a membrane-electrode assembly for fuel cells including (a) admixing a metal catalyst, an ionomer and a first dispersion solvent to prepare a first admixture, (b) heat treating the first admixture to form an ionomer-fixed metal catalyst and (c) immersing the ionomer-fixed metal catalyst in a solvent. The solvent may suitably include a polar solvent such as alcohols, for example, one or more alcohols. When one or more alcohols are used, preferably, at least about 10, 20, 30, 40, 50, 60, 70, 80 90 or 95 weight percent or more of the total solvent component weigh is the one or more alcohols.

The polar solvent may suitably include one or more selected from the group consisting of methanol, ethanol, propanol, and isopropyl alcohol.

The term "ionomer" as used herein refers to a polymer or resin material that contains repeating and/or randomly arranging units of electrically neutral monomers and ionized monomers (e.g., cationic or anionic), and the ionized monomers may include cationic groups such as amines and anionic groups such as carboxylic acid or sulfonyl acid.

The method may further include drying the first admixture prepared in (a) before the heat treating. The drying as meant herein refers to removing a solvent component (e.g., the first dispersion solvent) in the first admixture by increasing a temperature or heating above a boiling point the solvent component.

The metal catalyst in (a) may include a metal and a carbon support. The metal may be supported on the carbon support. The metal may suitably include one or more selected from the group consisting of platinum (Pt), iridium (Ir), palladium (Pd), ruthenium (Ru), rhodium (Rh), gold (Au), silver (Ag), cobalt (Co), and nickel (Ni).

The ionomer in (a) may suitably include one or more selected from the group consisting of a polysulfone-based resin, a polyether-based resin, a polyester-based resin, a polyester-ketone-based resin, a polybenzimidazole-based resin, a polyimide-based resin, a polyphenylene sulfide-based resin, a polyphenylene oxide-based resin, and Nafion.

The first dispersion solvent in (a) may suitably include one or more selected from the group consisting of distilled water, methanol, ethanol, propanol, isopropyl alcohol (IPA), ethylene glycol (EG), and 2-ethoxy ethanol.

The method may further include adding a first antioxidant to the first admixture prepared in (a). The first antioxidant may suitably include one or more selected from the group consisting of cerium oxide, zirconium oxide, and cerium zirconium oxide.

The drying the first admixture may be carried out at a temperature of about 60 to 90° C. and then heat-treatment may be carried out at a temperature of about 110 to 170° C.

The immersing in (c) may be carried out for about 48 to 96 hours.

The method may further include, after (c), (d) adding a second dispersion solvent to the solvent, in which the ionomer-fixed metal catalyst is immersed, of (c) to prepare a second admixture, (e) dispersing the second admixture prepared in (d), and (f) coating release paper with the resulting second admixture to form a catalyst layer.

The second dispersion solvent in (d) may suitably be a polar solvent, for example, include one or more selected from the group consisting of distilled water, methanol, ethanol, propanol, butanol, amyl alcohol, isopropyl alcohol (IPA), ethylene glycol (EG), and 2-ethoxy ethanol. The second dispersion solvent may be the same or different from the first dispersion solvent.

The method may further include adding a second antioxidant to the second admixture prepared in (d). The second anti-oxidant may suitably include one or more selected from the group consisting of cerium oxide, zirconium oxide, and cerium zirconium oxide.

The dispersing in (e) may be carried out using a grinder, a homogenizer, a colloid mill or a high-pressure homogenizer.

In another aspect, provided is a fuel cell that may include the membrane-electrode assembly manufactured by the method described above.

Still further provided is a vehicle including the fuel cell as described above. Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
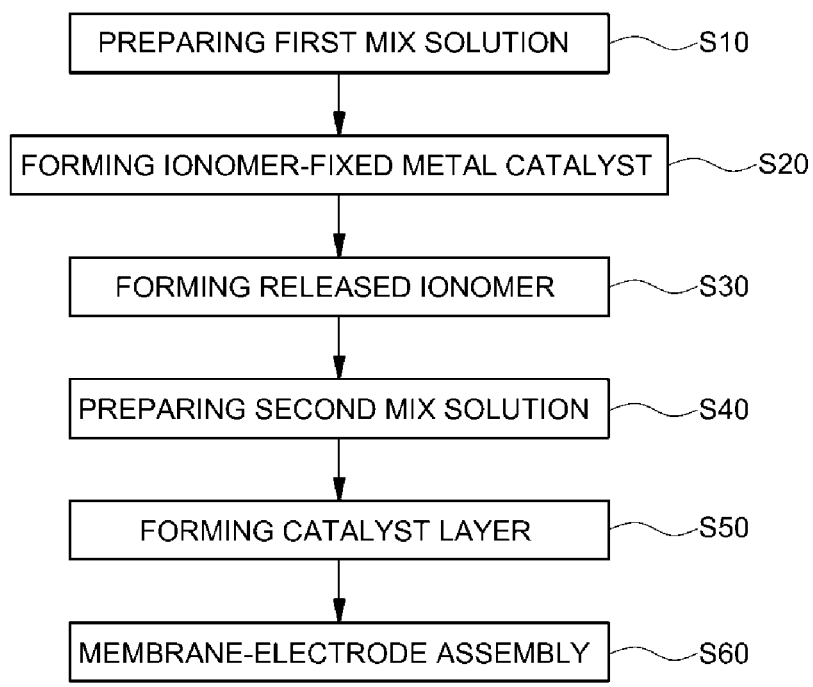
FIG. 1 is a flowchart illustrating an exemplary method of manufacturing an exemplary membrane-electrode assembly for exemplary fuel cells.

The objects described above, and other objects, features and advantages will be clearly understood from the following preferred embodiments with reference to the annexed drawings. However, the present invention is not limited to the embodiments and will be embodied in different forms. The embodiments are suggested only to offer thorough and complete understanding of the disclosed contents and sufficiently inform those skilled in the art of the technical concept of the present invention.

Like reference numbers refer to like elements throughout the description of the figures. In the drawings, the sizes of structures are exaggerated for clarity. It will be understood that, although the terms first, second, etc. may be used herein to describe various elements, these elements should not be limited by these terms and are used only to distinguish one element from another. For example, within the scope defined by the present invention, a first element may be referred to as a second element and similarly, a second element may be referred to as a first element. Singular forms are intended to include plural forms as well, unless context clearly indicates otherwise.

It will be further understood that the terms "comprises", "has" and the like, when used in this specification, specify the presence of stated features, number, steps, operations, elements, components or combinations thereof, but does not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless context clearly indicates otherwise, all of numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all the numbers, figures and/or expressions. In addition, when number ranges are disclosed in the description, these ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined.

It should be understood that, in the specification, when the range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a method of manufacturing a membrane-electrode assembly for fuel cells will be described in detail with reference to the annexed drawings.

FIG. 1 is an exemplary flowchart illustrating an exemplary method of manufacturing an exemplary membrane-electrode assembly for an exemplary fuel cell.

Preferably, a metal catalyst, an ionomer and a first dispersion solvent may be admixed and stirred to prepare a first admixture (S10).

For example, the metal catalyst, the ionomer and the first dispersion solvent may be mixed and stirred using a stirrer, high pressure homogenizer or ultrasonic homogenizer so that these ingredients can be homogeneously dispersed.

The metal catalyst may include a metal and a carbon support. Preferably, the metal may be supported on the carbon support. The metal may suitably include one or more selected from the group consisting of platinum (Pt), iridium (Ir), palladium (Pd), ruthenium (Ru), rhodium (Rh), gold (Au), silver (Ag), cobalt (Co), and nickel (Ni), preferably platinum, but the present invention is not limited thereto. The carbon support may suitably include one or more selected from the group consisting of carbon black, carbon nanotubes (CNTs), and carbon nanofibers (CNFs).

The ionomer may suitably include one or more selected from the group consisting of a polysulfone-based resin, a polyether-based resin, a polyester-based resin, a polyester-ketone-based resin, a polybenzimidazole-based resin, a polyimide-based resin, a polyphenylene sulfide-based resin, a polyphenylene oxide-based resin, and Nafion.

The first dispersion solvent may suitably include one or more selected from the group consisting of distilled water, methanol, ethanol, propanol, isopropyl alcohol (IPA), ethylene glycol (EG), and 2-ethoxy ethanol The method may further include adding a first antioxidant to the first mix solution prepared in S10.

The first antioxidant as used herein may remove radicals formed on electrodes due to reactions of the fuel cell and to prevent deterioration in the ionomer and electrolyte membrane in the electrode. The first antioxidant may suitably include one or more from the group consisting of cerium oxide, zirconium oxide, and cerium zirconium oxide, and may suitably be present in an amount of about 0.5 to 2 parts by weight with respect to 100 parts by weight of the metal catalyst. When the first antioxidant is present in an amount of less than about 0.5 parts by weight, electrode durability may be deteriorated and when the first antioxidant is present in an amount greater than about 2 parts by weight, electrode performance may be deteriorated.

Then, the first mix solution may be dried and heat-treated to form an ionomer-fixed metal catalyst (S20).

The first mix solution prepared in S10 may be dried at a temperature of about 60 to 90° C. and then, heat-treated at a temperature of about 110 to 170° C. for 1 to 3 hours, or preferably for 2 hours to fix the ionomer on the metal catalyst.

When the drying temperature is less than about 60° C., process efficiency may be deteriorated due to long drying time, and when the drying temperature is greater than about 90° C., the risk of fire may increase.

When the heat-treating temperature is less than about 110° C., the fixing degree of ionomer to the catalyst may be insufficient, and when the heat-treating temperature is greater than about 170° C., dispersion of second mix solution may be difficult due to strong fixing of ionomer to the catalyst. When heat treatment is conducted at a high temperature of about 200° C. or greater, performance of the formed electrode may be deteriorated.

Then, the ionomer-fixed metal catalyst may be immersed in a solvent to form a released ionomer (S30).

By adding the ionomer-fixed metal catalyst prepared in S20 to the solvent and then immersing the same for about 48 to 96 hours, or preferably about 50 hours, a part of the fixed ionomer may be released from the metal catalyst. At this time, the solvent may suitably include one or more selected from the group consisting of ethanol, propanol, and isopropyl alcohol. Preferably, the solvent may include propanol.

When the immersion time is less than about 48 hours, the ionomer may be almost not released and improvement in adhesion between the electrode and the membrane may be insufficient, and when the immersion time is greater than about 96 hours, an excessively high amount of ionomer may be released and performance of fuel cells may be deteriorated.

Figure 2:
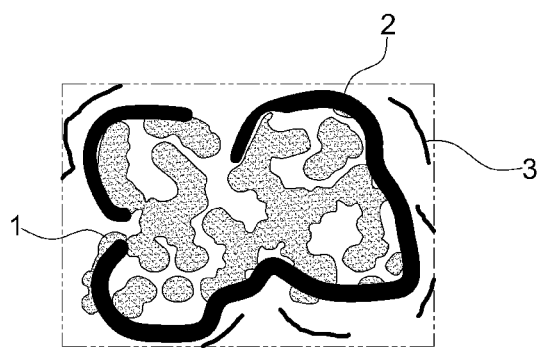
FIG. 2 shows formation of an exemplary released ionomer 3 after immersing, in v solvent, v metal catalyst 1 including an exemplary ionomer 2 fixed thereon.

FIG. 2 shows formation of an exemplary released ionomer 3 after immersing, in an exemplary solvent, an exemplary metal catalyst 1 including an exemplary ionomer 2 fixed thereon.

The ionomer 3 released from the metal catalyst 1 may freely flow, which may increase adhesion between the electrode and the membrane and prevent separation of the electrode from the membrane in spite of frequent shrinking and expansion caused by changes in temperature and humidity, thus improving safety of fuel cells.

Figure 3:
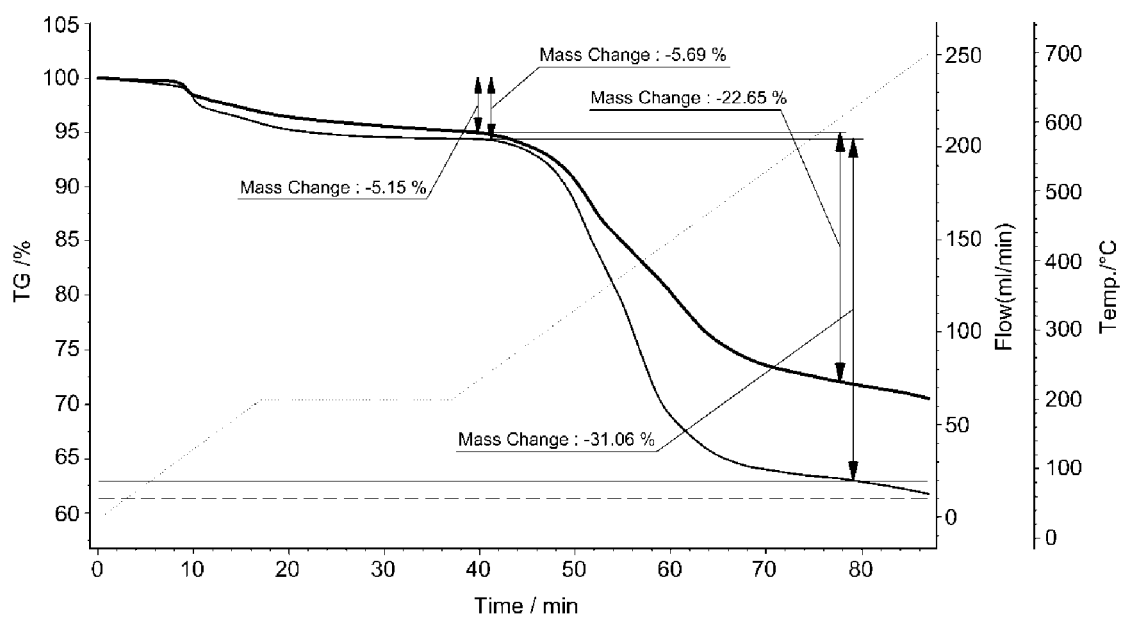
FIG. 3 is a graph showing results of measurement of content of ionomer-fixed metal catalyst over time after immersion in the solvent using a thermogravimetric analyzer.
Figure 4:
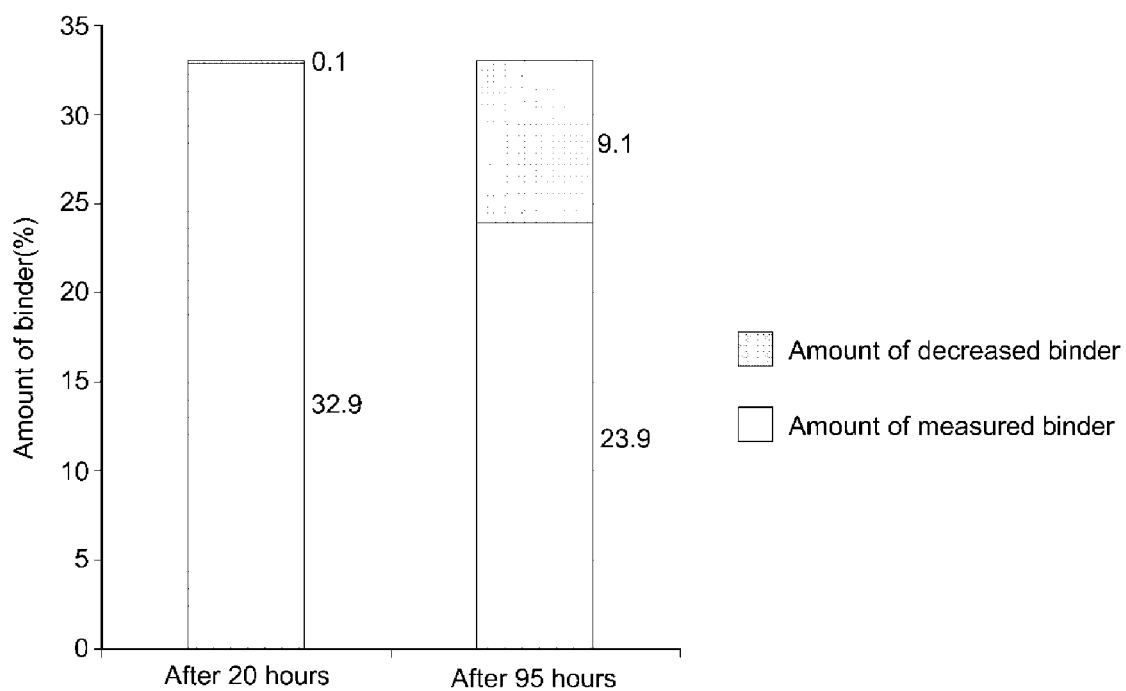
FIG. 4 shows comparison of the amount of the fixed ionomer in Example 1 and Comparative Example 1.

FIGS. 3 and 4 are graphs showing results of measurement of content of an exemplary ionomer-fixed metal catalyst over time after immersion in the solvent using a thermogravimetric analyzer.

For example, after 20 hours, the content of the fixed ionomer is decreased by 0.1%, whereas, after 95 hours, the content of fixed ionomer is decreased by 9.1%. This means that 9.1% of the ionomer fixed on the metal catalyst may be released therefrom. In other words, the total content may be maintained at 33%, which means that the final content of ionomer in the electrode may be the same as the initial content thereof.

Then, a second dispersion solvent may be added to the solvent containing the released ionomer to prepare a second mix solution (S40).

The second mix solution may be prepared by adding a second dispersion solvent to the released ionomer-containing solvent prepared in S30, followed by mixing and stirring. The mixing and stirring may be carried out using a stirrer.

The second dispersion solvent may the same or different from the first dispersion solvent. The second dispersion solvent may suitably include one or more selected from the group consisting of distilled water, methanol, ethanol, propanol, butanol, amyl alcohol, isopropyl alcohol (IPA), ethylene glycol (EG), and 2-ethoxy ethanol\.

The method may further include adding a second antioxidant to the second mix solution prepared in S40.

The second antioxidant as used herein may remove radicals produced on electrodes due to reactions of the fuel cell and prevent deterioration in the ionomer and electrolyte membrane in the electrode. The second antioxidant may suitably include one or more selected from the group consisting of cerium oxide, zirconium oxide, and cerium zirconium oxide and may be the same or different as the first antioxidant.

The second mix solution may be and dispersed, and then coated on release paper of the electrode to form a catalyst layer (S50).

The second mix solution prepared in S40 may be dispersed or homogenized in a grinder, a homogenizer, a colloid mill or a high-pressure homogenizer, and then coated on release paper of the electrode using a sprayer, bar coater, slot die cutter, dam coater, comma coater or the like. The release paper may suitably include one or more selected from the group consisting of polyethylene naphthalate (PEN), polyethylene terephthalate (PET), and polytetrafluoroethylene (PTFE).

After formation of the catalyst layer described above is completed, the electrode provided with the catalyst layer may be joined to the membrane to obtain a membrane-electrode assembly (S60). The membrane-electrode assembly (MEA) manufactured by the method may suitably include a released ionomer-containing catalyst layer, thereby improving adhesion between the electrode and the membrane, and preventing separation of the electrode from the membrane in spite of frequent shrinkage and expansion. Also, durability of fuel cells may be improved under freezing and thawing conditions.

EXAMPLE

Hereinafter, exemplary embodiments of the present invention will be described in more detail.

Example 1. Production of Membrane-Electrode Assembly

Platinum (Pt) supported on carbon (C), an ionomer, water, ethanol and propanol were mixed using a stirrer and a high-pressure sprayer to prepare a first mix solution. Then, the first mix solution was dried in an over at a temperature of 80° C. for 20 hours and then at a temperature of 120° C. for 2 hours to fix the ionomer on Pt/C. Then, the ionomer-fixed Pt/C catalyst was immersed in propanol for 50 hours and propanol was added thereto to prepare a second mix solution. The second mix solution was coated on release paper of an electrode to form a coating layer and then the coating layer was joined to a membrane to produce a membrane-electrode assembly.

Comparative Example 1. Production of Membrane-Electrode Assembly

A membrane-electrode assembly was produced in the same manner as in Example 1, except that the process of immersing the ionomer-fixed Pt/C catalyst in a solvent to form a released ionomer was emitted.

Test Example 1. Testing of Durability of Membrane-Electrode Assembly

The following test was conducted to evaluate adhesion between the electrode and the membrane of membrane-electrode assemblies obtained in Example 1 and Comparative Example 1 according to the present invention.

The thicknesses of 1×15 cm specimens of Example 1 and Comparative Example 1 were measured. Then, respective specimens were mounted on a tensile jig of a universal testing machine (UTM) and then stress was applied to the specimens at a rate of 50 cm/min under conditions 25±5° C. and RH 50±10%. Then, the amount of electrode remaining on the broken membrane-electrode assembly (MEA) was observed by the naked eye.

Figure 5A:
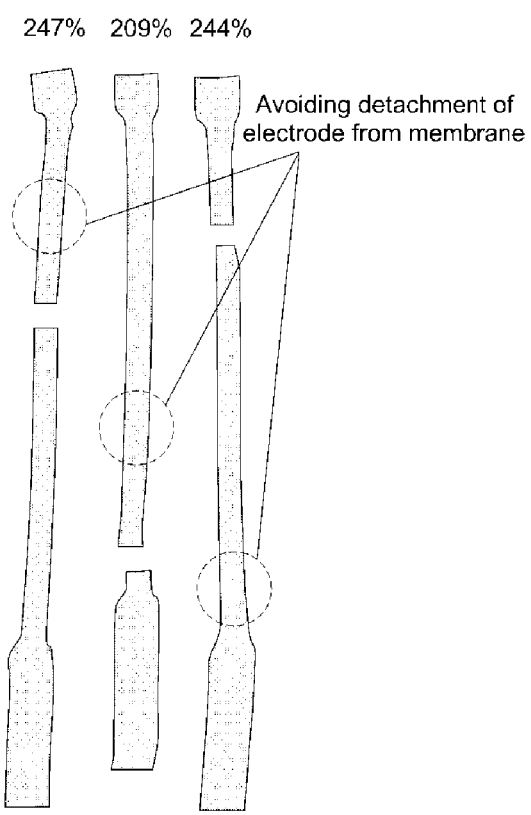
FIG. 5A is an image showing test results from Example 1 and FIG. 5B is an image showing test results from Comparative Example 1.
Figure 5B:
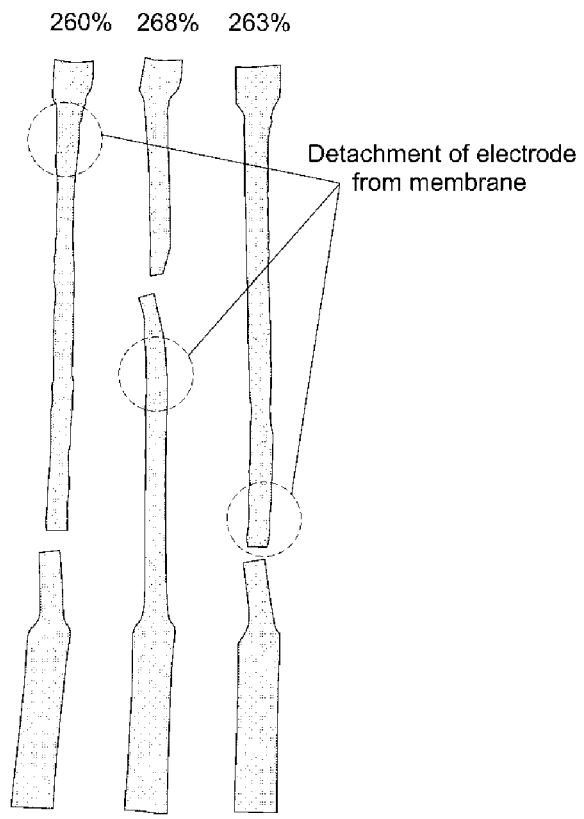

FIG. 5A-5B is an image showing test results from the above experiments using Example 1 and Comparative Example 1 (FIG. 5A: Example 1; and FIG. 5B: Comparative Example 1).

As a result, referring to FIG. 5, Comparative Example 1 showed that the electrode was detached from the membrane due to shrinkage and expansion, whereas Example 1 showed that detachment of the electrode from the membrane was avoided. Accordingly, the released ionomer may improve adhesion between the electrode and the membrane.

The various exemplary embodiments of the present invention provide a method of manufacturing a membrane-electrode assembly with improved durability for fuel cells by applying a catalyst including a released ionomer to the membrane-electrode assembly to improve adhesion between the electrode and the membrane.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a membrane-electrode assembly for fuel cells comprising:
   (a) admixing a metal catalyst, an ionomer and a first dispersion solvent to prepare a first admixture;
   (b) heat treating the first admixture to form an ionomer-fixed metal catalyst; and
   (c) immersing the ionomer-fixed metal catalyst in a polar solvent for 48 to 96 hours to form a released ionomer.

2. The method of claim 1, wherein the polar solvent comprises one or more alcohols.

3. The method of claim 1, wherein the polar solvent comprises one or more selected from the group consisting of methanol, ethanol, propanol, and isopropyl alcohol.

4. The method of claim 1, further comprising drying the first admixture prepared in (a) before the heat treating.

5. The method of claim 1, wherein the metal catalyst in (a) comprises a metal and a carbon support.

6. The method of claim 5, wherein the metal is supported on the carbon support.

7. The method of claim 3, wherein the metal comprises one or more selected from the group consisting of platinum (Pt), iridium (Ir), palladium (Pd), ruthenium (Ru), rhodium (Rh), gold (Au), silver (Ag), cobalt (Co), and nickel (Ni).

8. The method of claim 1, wherein the ionomer in (a) comprises a Nafion.

9. The method of claim 1, wherein the first dispersion solvent in (a) comprises one or more selected from the group consisting of distilled water, methanol, ethanol, propanol, isopropyl alcohol (IPA), ethylene glycol (EG), and 2-ethoxy ethanol.

10. The method of claim 1, further comprising adding a first antioxidant to the first admixture prepared in (a),
   wherein the first antioxidant comprises one or more selected from the group consisting of cerium oxide, zirconium oxide, and cerium zirconium oxide.

11. The method of claim 4, wherein the drying the first admixture is carried out at a temperature of about 60 to 90° C. and then the heat treating is carried out at a temperature of about 110 to 170° C.

12. The method of claim 1, further comprising:
   after (c),
   (d) adding a second dispersion solvent to the solvent, in which the ionomer-fixed metal catalyst is immersed, of (c) to prepare a second admixture;
   (e) dispersing the second admixture prepared in (d); and
   (f) coating release paper with the resulting second admixture to form a catalyst layer.

13. The method of claim 12, wherein the second dispersion solvent in (d) comprises one or more selected from the group consisting of distilled water, methanol, ethanol, propanol, butanol, amyl alcohol, isopropyl alcohol (IPA), ethylene glycol (EG), and 2-ethoxy ethanol.

14. The method of claim 12, further comprising adding a second antioxidant to the second admixture prepared in (d),
   wherein the second anti-oxidant comprises one or more selected from the group consisting of cerium oxide, zirconium oxide, and cerium zirconium oxide.

15. The method of claim 12, wherein the dispersing in (e) is carried out using a grinder, a homogenizer, a colloid mill or a high-pressure homogenizer.

* * * * *